United States Patent
Kondo

(10) Patent No.: US 6,968,122 B2
(45) Date of Patent: Nov. 22, 2005

(54) RECORDER AND TRANSMITTER

(75) Inventor: Satoshi Kondo, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 985 days.

(21) Appl. No.: 09/834,928

(22) Filed: Apr. 16, 2001

(65) Prior Publication Data

US 2001/0055358 A1  Dec. 27, 2001

(30) Foreign Application Priority Data

Apr. 17, 2000 (JP) .............................. 2000-114860

(51) Int. Cl.[7] .............................................. H04N 5/91
(52) U.S. Cl. ........................ 386/131; 386/94; 386/46; 360/60
(58) Field of Search ............................... 386/1, 46, 21, 386/94, 113, 131; 360/60, 69; 369/59.13–59.27; 725/131, 133, 139, 141, 151, 153; 370/465–468; 709/246; 348/441–459

(56) References Cited

U.S. PATENT DOCUMENTS

| | | | |
|---|---|---|---|
| 5,555,097 A * | 9/1996 | Joung et al. ................. 386/131 |
| 5,649,048 A | 7/1997 | Tomita et al. |
| 5,784,113 A | 7/1998 | Rhodes |
| 6,014,492 A * | 1/2000 | Kim et al. ..................... 360/69 |
| 6,047,103 A * | 4/2000 | Yamauchi et al. ............. 386/94 |
| 6,104,865 A * | 8/2000 | Hamaguchi et al. ......... 386/131 |
| 6,711,343 B1 * | 3/2004 | Matsumi et al. ............... 386/46 |
| 6,763,174 B2 * | 7/2004 | Ohara et al. ................... 386/46 |

FOREIGN PATENT DOCUMENTS

| | | |
|---|---|---|
| EP | 0 507 614 | 10/1992 |
| JP | 8-273305 | 10/1996 |
| WO | 97/28630 | 8/1997 |

* cited by examiner

Primary Examiner—James J. Groody
Assistant Examiner—Christopher Onuaku
(74) Attorney, Agent, or Firm—Wenderoth, Lind & Ponack, L.L.P.

(57) ABSTRACT

A transmitter comprises a demodulation means for demodulating inputted stream data to digital data, and outputting the digital data to a digital interface; a decoding means for decoding the digital data to obtain an analog signal; and a format conversion means for converting the format of the analog signal, and outputting the analog signal to an analog interface. A recorder comprises a judgement means for judging whether the inputted digital data is recordable by the recorder or reproducible after recording; a data recording means for recording the digital data on a recording medium when the judgement means judges that the digital data is recordable; and a coding means for coding the analog signal when the judgement means judges that the digital data is unrecordable. Therefore, the data outputted from the transmitter such as a set-top box can be reliably recorded by the recorder.

13 Claims, 11 Drawing Sheets

RECORDER AND TRANSMITTER

FIELD OF THE INVENTION

The present invention relates to a transmitter and a recorder for receiving and then transmitting and recording digital data such as an MPEG2 transport stream or the like, which is transmitted by broadcasting, communication, or the like.

BACKGROUND OF THE INVENTION

Conventionally, a transmitter 2001 and a recorder 2002 as shown in FIG. 11 are used for recording video data, audio data, and other data, which are transmitted by digital broadcasting. In FIG. 11, the transmitter (set-top box) 2001 receives digital-modulated stream data 2003 through an antenna, cable, or, the like, and demodulates the stream data 2003 to convert it into digital data. Generally, an MPEG2 transport stream is used as a format of digital data.

The digital data demodulated by the transmitter 2001 is input to the recorder 2002 through a digital interface 2004, and recorded. Preferably, an IEEE 1394 digital interface may be used as the digital interface 2004. Further, the recorder 2002 may have, as a recording medium, a D-VHS, a hard disk, or an optical disk.

However, when the data transmitted by digital broadcasting is recorded using the conventional transmitter 2001 and recorder 2002, the recorder 2002 cannot record the inputted digital data in the case as follows: when the bit rate of the digital data is higher than the maximum bit rate that can be handled by the recorder 2002; when the digital data is in a format that cannot be recorded by the recorder 2002; or when the digital data is in a format that cannot be reproduced after recording by the recorder 2002.

SUMMARY OF THE INVENTION

The present invention is made to solve the above-described problems and has for its object to provide a recorder that can reliably record inputted digital data, or a recorder that does not record, by mistake, a part of data unreproducible after recording, and a transmitter that can output data surely recordable by the recorder.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a recorder comprises judgement means for receiving first digital data, and judging whether the first digital data is recordable, or whether the first digital data is reproducible after recording; format conversion means for receiving a first analog signal obtained by decoding the first digital data, and format-converting the first analog signal into a second analog signal when the judgement means judges that the first digital data is unrecordable or unreproducible after recording; coding means for receiving the first or second analog signal, and coding the first or second analog signal to second or third digital data when the judgement means judges that the first digital data is unrecordable; switching means for receiving the second or third digital data as well as the first digital data, and outputting the first digital data when the judgement means judges that the first digital data is recordable or reproducible after recording, while outputting the second or third digital data when the judgement means judges that the first digital data is unrecordable or unreproducible after recording; and data recording means for recording the digital data outputted from the switching means on a recording medium.

According to a second aspect of the present invention, the recorder of the first aspect comprises: the judgement means receiving the first digital data, and judging whether each of plural kinds of data included in the first digital data is recordable or reproducible after recording; the format conversion means receiving the first analog signal obtained by decoding the first digital data, and performing format conversion from the first analog signal into the second analog signal, with respect to the data that is judged as being unrecordable or unreproducible after recording by the judgement means; the coding means receiving the first or second analog signal, and coding the first or second analog signal to the second or third digital data, with respect to the data that is judged as being unrecordable or unreproducible after recording by the judgement means; data extraction means for receiving the first digital data, and extracting, as fourth digital data, the data that is judged as being recordable or reproducible after recording by the judgement means; multiplexing means for multiplexing the second or third digital data with the fourth digital data to generate fifth digital data; and the recording means recording the fifth digital data on the recording medium.

According to a third aspect of the present invention, a recorder comprises: judgement means for receiving first digital data, and judging whether the first digital data is recordable; data conversion means for converting the first digital data into recordable second digital data when the judgement means judges that the first digital data is unrecordable; switching means for receiving the first and second digital data, and outputting the, first digital data when the judgement means judges that the first digital data is recordable, while outputting the second digital data when the judgement means judges that the first digital data is unrecordable; and data recording means for recording the digital data outputted from the switching means on a recording medium.

According to a fourth aspect of the present invention, in the recorder of the third aspect, the judgement means judges that the first digital data is unrecordable when the bit rate of the first digital data is higher than a predetermined bit rate.

According to a fifth aspect of the present invention, a recorder comprises: judgement means for receiving first digital data, and judging whether the first digital data is reproducible after recording; data conversion means for converting the first digital data into second digital data that is reproducible after recording, when the judgement means judges that the first digital data is unreproducible after recording; switching means for receiving the first and second digital data, and outputting the first digital data when the judgement means judges that the first digital data is reproducible, while outputting the second digital data when the judgement means judges that the first digital data is unreproducible; and data recording means for recording the digital data outputted from the switching means on a recording medium.

According to a sixth aspect of the present invention, in the recorder of the fifth aspect, the judgement means judges that the first digital data is unreproducible after recording, when a coding method used for the first digital data is a method that does not permit decoding by the recorder.

According to a seventh aspect of the present invention, a transmitter comprises: system control means for making an inquiry about whether digital data to be output is recordable by a recorder to which the digital data is transmitted, or whether the digital data is reproducible after recording; data transmission means for outputting the digital data when it is judged that the digital data is recordable or reproducible after recording by the recorder, on the basis of the result of the inquiry from the system control means; decoding means for decoding the digital data into a first analog signal, when it is judged that the digital data is unrecordable or unreproducible after recording by the recorder, on the basis of the result of the inquiry from the system control means; and format conversion means for converting the first analog signal into a second analog signal of a data format that is recordable by the recorder or reproducible after recording; wherein the decoding means outputs the first analog signal or the format conversion means outputs the second analog signal, when it is judged that the digital data is unrecordable or unreproducible after recording by the recorder, on the basis of the result of the inquiry from the system control means.

According to an eighth aspect of the present invention, a transmitter comprises: system control means for making an inquiry about a recordable data format, to a recorder to which first digital data is to be output; data conversion means for converting the first digital data into second digital data of a recordable data format, when it is judged that the digital data is unrecordable by the recorder, on the basis of the result of the inquiry from the system control means; and data transmission means for receiving the first and second digital data, and outputting the first digital data when it is judged that the first digital data is recordable by the recorder on the basis of the result of the inquiry from the system control means, while outputting the second digital data when it is judged that the digital data is unrecordable by the recorder on the basis of the result of the inquiry.

According to a ninth aspect of the present invention, in the transmitter of the eighth aspect, the inquiry from the system control means relates to the bit rate of the digital data, or the format of video data of the digital data.

According to a tenth aspect of the present invention, a transmitter comprises: system control means for making an inquiry about a data format that is reproducible after recording, to a recorder to which first digital data is to be output; data conversion means for converting the first digital data into second digital data of a data format that is reproducible after recording by the recorder, when it is judged that the digital data is unreproducible after recording, on the basis of the result of the inquiry from the system control means; and data transmission means for receiving the first and second digital data, and outputting the first digital data when it is judged that the first digital data is reproducible after recording by the recorder on the basis of the result of the inquiry from the system control means, while outputting the second digital data when it is judged that the digital data is unreproducible after recording by the recorder on the basis of the result of the inquiry.

According to an eleventh aspect of the present invention, in the transmitter of the tenth aspect, the inquiry from the system control means relates to the bit rate of the digital data, or the format of video data of the digital data.

According to a twelfth aspect of the present invention, a recorder comprises: data inspection means for receiving digital data, and judging whether the digital data is recordable; and data recording means for recording the digital data on a recording medium when the data inspection means judges that the digital data is recordable, and stopping recording of the digital data on the recording medium when the data inspection means judges that the digital data is unrecordable.

According to a thirteenth aspect of the present invention, a recorder comprises: demodulation means for demodulating digital-modulated stream data to first digital data; judgement means for receiving the first digital data, and judging whether the first digital data is recordable; data conversion means for converting the digital data into second digital data of a recordable data format, when the judgement means judges that the first digital data is unrecordable; switching means for receiving the first and second digital data, and outputting the first digital data when the judgement means judges that the first digital data is unrecordable, while outputting the second digital data when the judgement means judges that the digital data is unrecordable; and data recording means for recording the digital data outputted from the switching means, on a recording medium.

DETAILED DESCRIPTION OF THE PREFERRED EMBODIMENTS

Hereinafter, the preferred embodiments of the present invention will be described with reference to the drawings.

[Embodiment 1]

Figure 1:
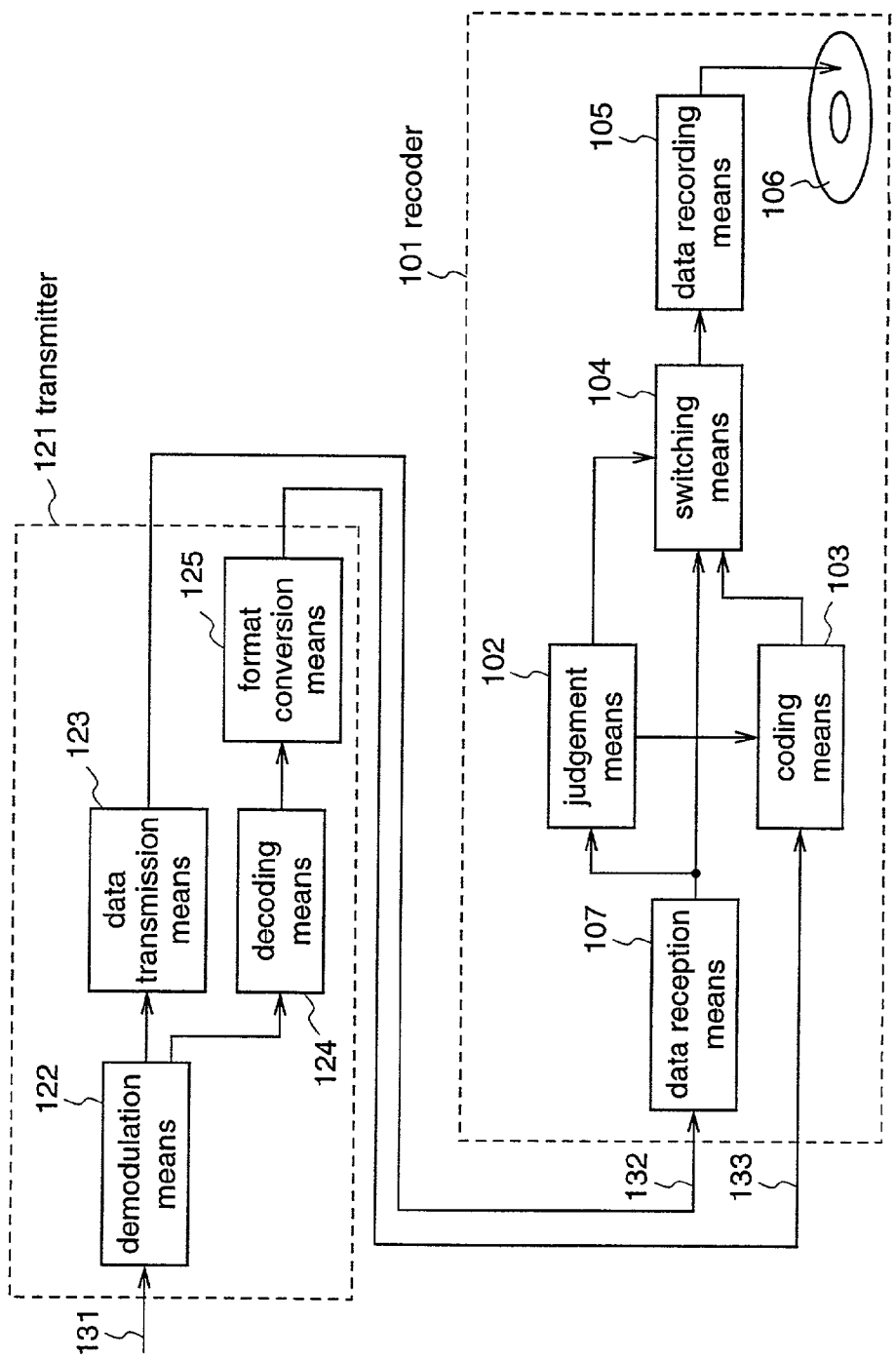
FIG. 1 is a block diagram for explaining a recorder and a transmitter according to a first embodiment of the present invention.

Initially, a first embodiment of the present invention will be described with reference to FIG. 1. FIG. 1 is a block diagram for explaining the connection between a recorder 101 and a transmitter 121, wherein the recorder 101 comprises a judgement means 102, a coding means 103, a switching means 104, a data recording means 105, a recording medium 106, and a data reception means 107, while the transmitter 121 comprises a demodulation means 122, a data transmission means 123, a decoding means 124, and a format conversion means 125. Reference numerals 132 and 133 denote a digital interface and an analog interface, respectively.

The transmitter 121 receives digital-modulated stream data 131 through an antenna, cable, or the like, and the demodulation means 122 demodulates the inputted stream data 131 to convert it into digital data. Generally, an MPEG2 transport stream is used as a format of digital data. The digital data is input to the data transmission means 123 and to the decoding means 124. The data transmission means 123 converts the inputted digital data into a data format adaptive to the digital interface 132, and outputs the converted digital data to the digital interface 132. Preferably, an IEEE 1394 digital interface or the like is used as the digital interface 132.

The digital data input to the decoding means 124 is subjected to decoding to be a decoded signal, i.e., an analog signal. For example, when the digital data includes video data and audio data, the decoding means 124 outputs a video signal and an audio signal. The outputted decoded signal is input to the format conversion means 125.

The format conversion means 125 converts the format of the input decoded signal. Hereinafter, a description will be given of conversion of the format of a video signal. For example, when the video signal inputted to the format conversion means 125 is a high-resolution video signal, the format conversion means 125 converts this video signal into a low-resolution video signal to be output. The decoded signal, which has been subjected to format conversion in the format conversion means 125, is output to the analog interface 133.

The recorder 101 receives the digital data from the transmitter 121 through the digital interface 132, and receives the format-converted decoded signal from the transmitter 121 through the analog interface 133. The digital data is received by the data reception means 107, and restored to the original data format, and thereafter, inputted to the judgement means 102 and to the switching means 104.

The judgement means 102 judges whether the inputted digital data is recordable on the recording medium 106, or whether the digital data is reproducible after recorded on the recording medium 106.

For example, when the bit rate of the digital data is higher than the maximum recordable rate of the recording medium 106, the judgement means 102 judges that the digital data is not recordable.

Further, when a decoding means (not shown) included in the recorder 101 cannot decode the digital data, the digital data cannot be reproduced after recording. For example, the decoding means (not shown) cannot decode the digital data when the digital data is a high-resolution video signal and the decoding means is adaptable to only decode a low-resolution video signal, or when the audio data included in the digital data is of MPEG format and the decoding means is adaptable to only decode an audio signal of AC-3 format.

The result of judgement by the judgement means 102 is output to the coding means 103 and to the switching means 104.

The coding means 103 does not operate when the judgement means 102 judges that the digital data is recordable or reproducible after recording. When the judgement means 102 judges that the digital data is unrecordable or unreproducible after recording, the coding means 103 codes the video signal and audio signal supplied from the analog interface 133 to output them as coded data.

For example, when the judgement means 102 judges that the digital data is unreproducible after recording because the digital data is a high-resolution video signal and the decoding means is adaptable to only decode a low-resolution video signal, the coding means 103 codes the low-resolution video signal supplied from the transmitter 121 to output coded data.

Further, when the judgement means 102 judges that the digital data is unreproducible after recording because the audio data included in the digital data is in the MPEG format and the decoding means is adaptable to only decode an audio signal in the AC-3 format, the coding means 103 codes the analog audio signal supplied from the transmitter 121, by the MPEG coding method, to output coded data.

When the judgement means 102 judges that the digital data is recordable or reproducible after recording, the switching means 104 outputs the digital data supplied from the data reception means 107. When the judgement means 102 judges that the digital data is unrecordable or unreproducible after recording, the switching means 104 outputs the coded data supplied from the coding means 103.

The data recording means 105 subjects the data outputted from the switching means 104 to signal processing required to record the data on the recording medium 106. For example, when the recording medium 106 is an optical disk, the data recording means 106 subjects the data to addition of ECC, modulation, and the like. The data so processed is recorded on the recording medium 106.

As described above, the recorder according to the first embodiment of the invention is provided with the digital interface 132 and the analog interface 133, and when the digital data supplied from the digital interface 132 is unrecordable on the recording medium 106 or unreproducible after recording, the analog signal supplied from the analog interface 133 is coded and recorded on the recording medium 106. On the other hand, when the digital data supplied from the digital interface 132 is recordable or reproducible after recording, the digital data is recorded as it is.

Accordingly, even when the digital data supplied from the digital interface is unrecordable, since the analog signal supplied from the analog interface is coded and recorded, the data outputted from the transmitter is recorded with reliability. For example, when the digital data includes data obtained by coding a high-resolution video signal while the analog signal includes a low-resolution video signal generated by resolution conversion from the high-resolution video signal, even if the recorder cannot record the digital data including the high-resolution video data, the recorder can record the data of the low-resolution video signal. Further, even when the digital data supplied from the digital interface is unreproducible after recording, since the analog signal supplied from the analog interface is coded and recorded, the data transmitted from the transmitter is reliably recorded in a format which permits reproduction of the data after recording.

While in this first embodiment the format conversion means 125 converts a high-resolution video signal into a low-resolution video signal, the format conversion is not restricted thereto.

While in this first embodiment the format conversion means 125 converts a high-resolution video signal into a low-resolution video signal, if the coding means 103 is able to code the high-resolution video signal, the format conversion means 125 may output the high-resolution video signal as it is.

Further, while in this first embodiment the judgement means 102 judges that the digital data is unrecordable when the bit rate of the digital data is higher than the maximum recordable rate of the recording medium 106, the judgement means 102 may judge that the digital data is unrecordable also when copying of the digital data is inhibited by copy guard.

Further, in the first embodiment, the judgement means 102 judges that the digital data is unreproducible after recording when the digital data is a high-resolution video signal and the decoding means included in the recorder is adaptable to only decode a low-resolution video signal, or when the audio data included in the digital data is in the MPEG format and the decoding means is adaptable to only decode an audio signal in the AC-3 format. However, the judgement means 102 may also judge that the digital data is unreproducible after recording when the video data included in the digital data is coded by the PAL method and the decoding means is adaptable to only decode digital data in which video data is coded by the NTSC method, or when the dig by the MPEG4 coding method and the decoding means is adaptable to only decode digital data coded by the MPEG2 coding method.

[Embodiment 2]

Figure 2:
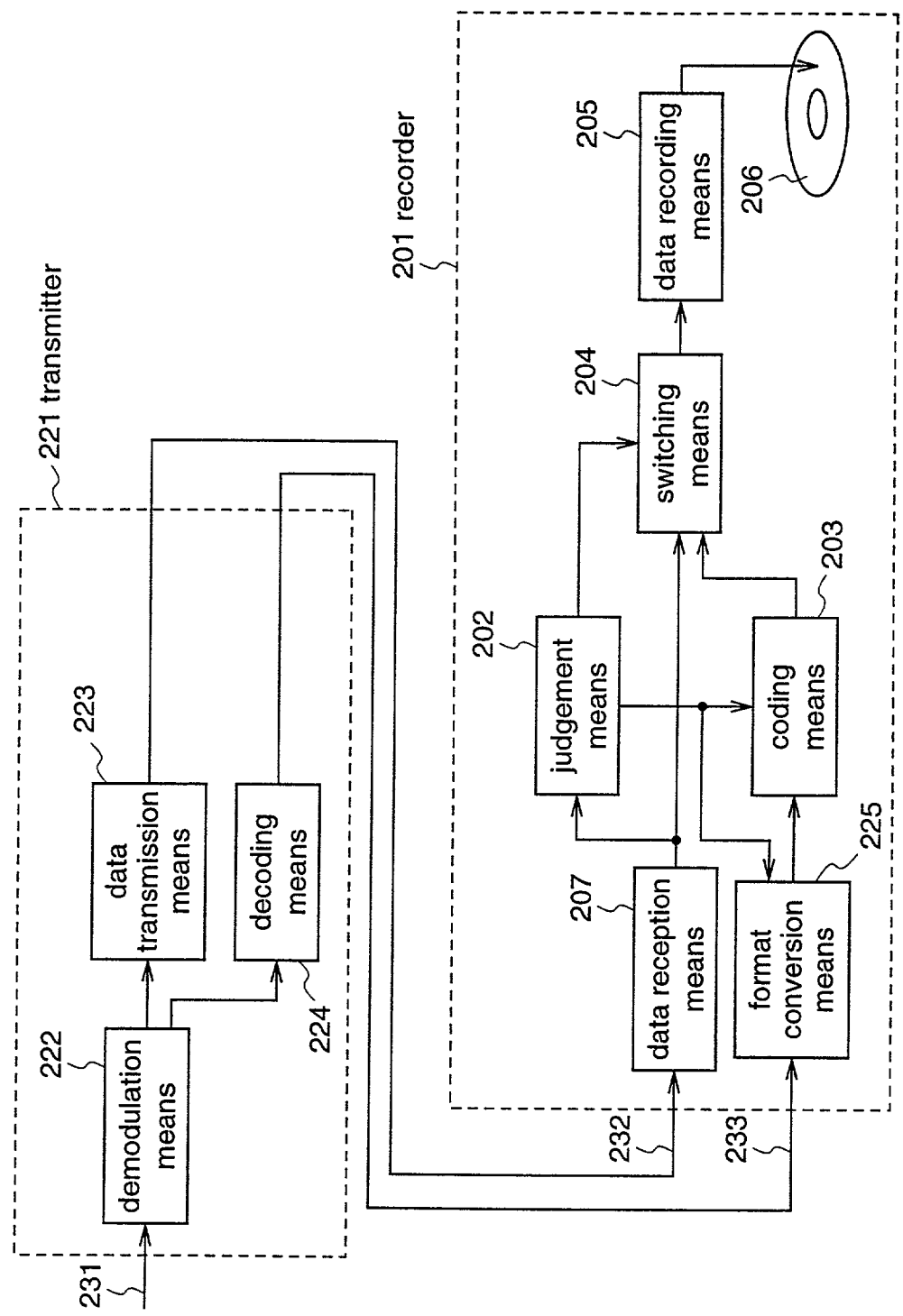
FIG. 2 is a block diagram for explaining a recorder and a transmitter according to a second embodiment of the present invention.

Hereinafter, a second embodiment of the present invention will be described with reference to FIG. 2. FIG. 2 is a block diagram for explaining the connection between a recorder 201 and a transmitter 221, wherein the recorder 201 comprises a judgement means 202, a coding means 203, a switching means 204, a data recording means 205, a recording medium 206, a data reception means 207, and a format conversion means 225, while the transmitter 221 comprises a demodulation means 222, a data transmission means 223, and a decoding means 224. Reference numerals 232 and 233 denote a digital interface and an analog interface, respectively.

The transmitter 221 receives digital-modulated stream data 231 through an antenna, cable, or the like, and the demodulation means 222 demodulates the input stream data 231 to convert it into digital data. The digital data is input to the data transmission means 223 and to the decoding means 224. The data transmission means 223 converts the input digital data into a data format corresponding to the digital interface 232, and outputs the converted digital data to the digital interface 232. The digital data inputted to the decoding means 224 is subjected to decoding, resulting in a decoded signal, i.e., an analog signal. The decoded signal is output to the analog interface 233.

The recorder 201 receives the digital data from the transmitter 221 through the digital interface 232, and receives the decoded signal from the transmitter 221 through the analog interface 233. The digital data is received by the data reception means 207, and restored to the original data format, and thereafter, supplied to the judgement means 202 and to the switching means 204.

The judgement means 202 judges whether the inputted digital data can be recorded on the recording medium 206, or whether the digital data can be reproduced after recorded on the recording medium 206.

For example, when the bit rate of the digital data is higher than the maximum recordable rate of the recording medium 206, the judgement means 202 judges that the digital data is unrecordable.

Further, when a decoding means (not shown) included in the recorder 201 cannot decode the digital data, the judgement means 202 judges that the digital data is unreproducible after recording. For example, the decoding means cannot decode the digital data in the case as follows: when the digital data is a high-resolution video signal and the decoding means is adaptable to only decode a low-resolution video signal; or when the audio data included in the digital data is in the MPEG format and the decoding means is adaptable to only decode an audio signal in the AC-3 format.

The result of the judgement by the judgement means 202 is output to the coding means 203, the switching means 204, and the format conversion means 225. The format conversion means 225 receives the decoded signal from the analog interface 233. The format conversion means 225 and the coding means 203 do not operate when the judgement means 202 judges that the digital data is recordable or reproducible after recording.

For example, when the judgement means 202 judges that the digital data is unrecordable or unreproducible after recording, the format conversion means 225 converts the received decoded signal into a signal in a format that can be recorded on the recording medium 206. For example, when the inputted decoded signal is a high-resolution video signal, the format conversion means 225 converts the video signal into a video signal of a low resolution. The converted decoded signal is input to the coding means 203. The coding means 203 codes the decoded signal, and outputs it as coded data to the switching means 204.

When the judgement means 202 judges that the digital data is recordable or reproducible after recording, the switching means 204 outputs the digital data supplied from the data reception means 207. When the judgement means 202 judges that the digital data is unrecordable or unreproducible after recording, the switching means 204 outputs the coded data supplied from the coding means 203.

The data recording means 205 subjects the data outputted from the switching means 204 to signal processing required to record the data on the recording medium 206, and records the data on the recording medium 206.

As described above, the recorder according to the second embodiment of the invention is provided with the digital interface 232 and the analog interface 233, and when the digital data supplied from the digital interface 232 is unrecordable on the recording medium 206 or unreproducible after recording, the analog signal supplied from the analog interface 232 is coded after format conversion, and the coded data is recorded on the recording medium 206. On the other hand, when the digital data supplied from the digital interface 232 is recordable or reproducible after recording, the digital data is recorded as it is.

Accordingly, even when the digital data supplied from the digital interface is unrecordable, since the analog signal supplied from the analog interface is converted into a recordable format and then coded and recorded, the data outputted from the transmitter is recorded with reliability. Further, even when the digital data supplied from the digital interface is unreproducible after recorded on the recording medium, since the analog signal supplied from the analog interface is subjected to format conversion and then coded and recorded, the data transmitted from the transmitter is reliably recorded in a format that permits reproduction of the data after recording.

While in this second embodiment the judgement means 202 judges that the digital data is unrecordable when the bit rate of the digital data is higher than the maximum recordable rate of the recording medium 206, the judgement means 202 may also judge that the digital data is unrecordable when copying of the digital data is inhibited by copy guard.

Further, in the second embodiment, the judgement means 202 judges that the digital data is unreproducible after recording when the digital data is a high-resolution video signal and the decoding means included in the recorder 201 is adaptable to only decode a low-resolution video signal, or when the audio data in the digital data is in the MPEG format and the decoding means is adaptable to only decode an audio signal in the AC-3 format. However, the judgement means 202 may also judge that the digital data is unreproducible after recording when the digital data is data that is video-coded by the PAL method and the decoding means is adaptable to only decode digital data that is video-coded by the NTSC method, or when the digital data is data coded by the MPEG4 coding method and the decoding means is adaptable to only decode digital data coded by the MPEG2 coding method.

[Embodiment 3]

Figure 3:
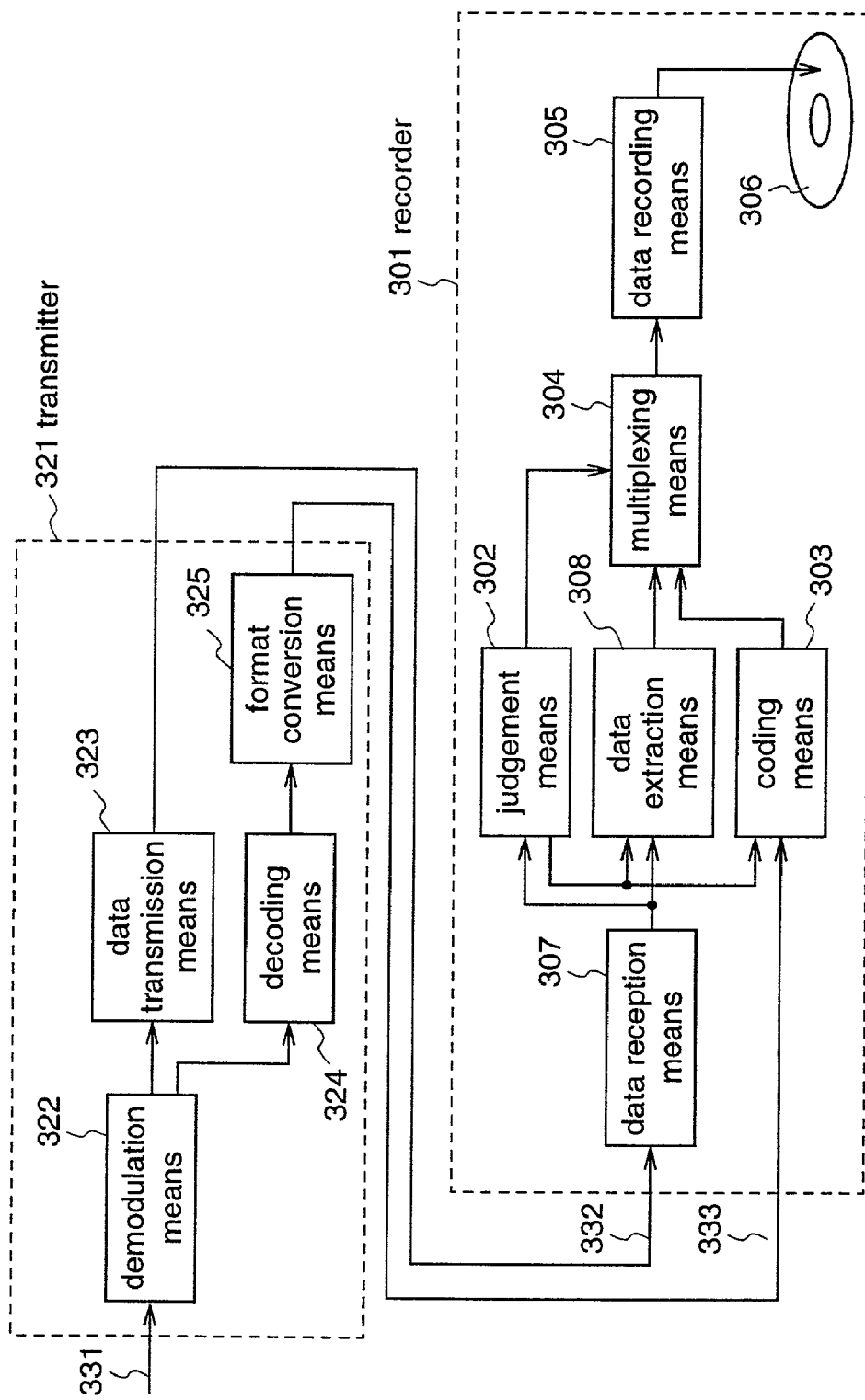
FIG. 3 is a block diagram for explaining a recorder and a transmitter according to a third embodiment of the present invention.

Hereinafter, a third embodiment of the present invention will be described with reference to FIG. 3. FIG. 3 is a block diagram for explaining the connection between a recorder 301 and a transmitter 321, wherein the recorder 301 comprises a judgement means 302, a coding means 303, a multiplexing means 304, a data recording means 305, a recording medium 306, a data reception means 307, and a data extraction means 308, while the transmitter 321 comprises a demodulation means 322, a data transmission means 323, a decoding means 324, and a format conversion means 325. Reference numerals 332 arid 333 denote a digital interface and an analog interface, respectively.

The transmitter 321 receives digital-modulated stream data 331 through an antenna, cable, or the like, and the demodulation means 322 demodulates the input stream data 331 to convert it into digital data. The digital data is input to the data transmission means 323 and to the decoding means 324. The data transmission means 323 converts the input digital data into a data format corresponding to the digital interface 332, and outputs the converted digital data to the digital interface 332. The digital data inputted to the decoding means 324 is subjected to decoding, resulting in a decoded signal, i.e., an analog signal. The decoded signal is subjected to format conversion by the format conversion means 325, and the format-converted decoded signal is output to the analog interface 333.

The recorder 301 receives the digital data from the transmitter 321 through the digital interface 332, and receives the decoded signal from the transmitter 321 through the analog interface 333. The digital data is received by the data reception means 307, and restored to the original data format, and thereafter, supplied to the judgement means 302 and to the data extraction means 308.

The judgement means 302 judges, for each of plural kinds of data included in the input digital data, whether the data can be recorded by the recorder 301, or whether the data is reproducible after recorded on the recording medium 306. Assuming that the digital data includes video data and audio data, the judgement means 302 performs the above-mentioned judgement on each of the video data and the audio data.

For example, when the bit rate of the digital data is higher than the maximum recordable rate of the recording medium 306, the judgement means 302 judges that the digital data is unrecordable.

Further, when a decoding means (not shown) included in the recorder 301 cannot decode the digital data, the judgement means 302 judges that the digital data is unreproducible after recording. For example, the decoding means cannot decode the digital data in the case as follows: when the digital data is a high-resolution video signal and the decoding means is adaptable to only decode a low-resolution video signal; or when the audio data included in the digital data is in the MPEG format and the decoding means is adaptable to only decode an audio signal in the AC-3 format.

The result of the judgement by the judgement means 302 is output to the coding means 303, the multiplexing means 304, and the data extraction means 308.

Hereinafter, a description will be given of the case where the video data is judged as being unrecordable or unreproducible after recording while the audio data is judged as being recordable or reproducible after recording. In this case, since the video data is judged as being unrecordable or unreproducible after recording, the coding means 303 codes the video signal in the decoded signal supplied from the analog interface 333, and outputs it as coded data to the multiplexing means 304.

The data extraction means 308 extracts the audio data that is judged by the judgement means 302 as being recordable or reproducible after recording, from the digital data supplied from the data reception means 307, and outputs the extracted audio data.

The multiplexing means 304 multiplexes the data supplied from the data extraction means 308 and the coded data of the video signal supplied from the coding means 303, and outputs the multiplexed data.

The data recording means 305 subjects the data outputted from the multiplexing means 304 to signal processing required to record the data on the recording medium 306, and records the data on the recording medium 306.

As described above, the recorder according to the third embodiment of the invention is provided with the digital interface 332 and the analog interface 333, and only the data that is recordable on the recording medium 306 or reproducible after recording is extracted from the digital data supplied from the digital interface 332. With respect to the data that is unrecordable on the recording medium 306 or unreproducible after recording among the data included in the digital data, the analog signal supplied from the analog interface 333 is coded to convert it into coded data. Then, the data extracted from the digital data and the data obtained by coding the analog signal are multiplexed and recorded on the recording medium 306.

Accordingly, even when the digital data supplied from the digital interface is unrecordable, since the analog signal supplied from the analog interface is coded and recorded, the data outputted from the transmitter is recorded with reliability. At this time, since the recordable data is extracted from the digital data and recorded, undesired degradation in data quality due to unnecessary coding is avoided.

Further, even when the digital data supplied from the digital interface is unreproducible after recorded on the recording medium, since the analog signal supplied from the analog interface is recorded, the data transmitted from the transmitter is reliably recorded in a format that permits reproduction of the data after recording.

While in this third embodiment the digital data includes video data and audio data, the combination of data to be handled is not restricted thereto. For example, it may be a combination of different kinds of video data, a combination of video data and auxiliary data, or a combination of audio data and auxiliary data.

Further, while in this third embodiment the judgement means 302 judges that the digital data is unrecordable when the bit rate of the digital data is higher than the maximum recordable rate of the recording medium 306, the judgement means 302 may also judge that the digital data is unrecordable when copying of the digital data is inhibited by copy guard.

Further, in the third embodiment, the judgement means 302 judges that the digital data is unreproducible after recording when the digital data is a high-resolution video signal and the decoding means included in the recorder 301 is adaptable to only decode a low-resolution video signal, or when the audio data in the digital data is in the MPEG format and the decoding means is adaptable to only decode an audio signal in the AC-3 format. However, the judgement means 302 may also judge that the digital data is unreproducible after recording when the digital data is data that is video-coded by the PAL method and the decoding means is adaptable to only decode digital data that is video-coded by the NTSC method, or when the digital data is data coded by the MPEG4 coding method and the decoding means is adaptable to only decode digital data coded by the MPEG2 coding method.

Figure 4:
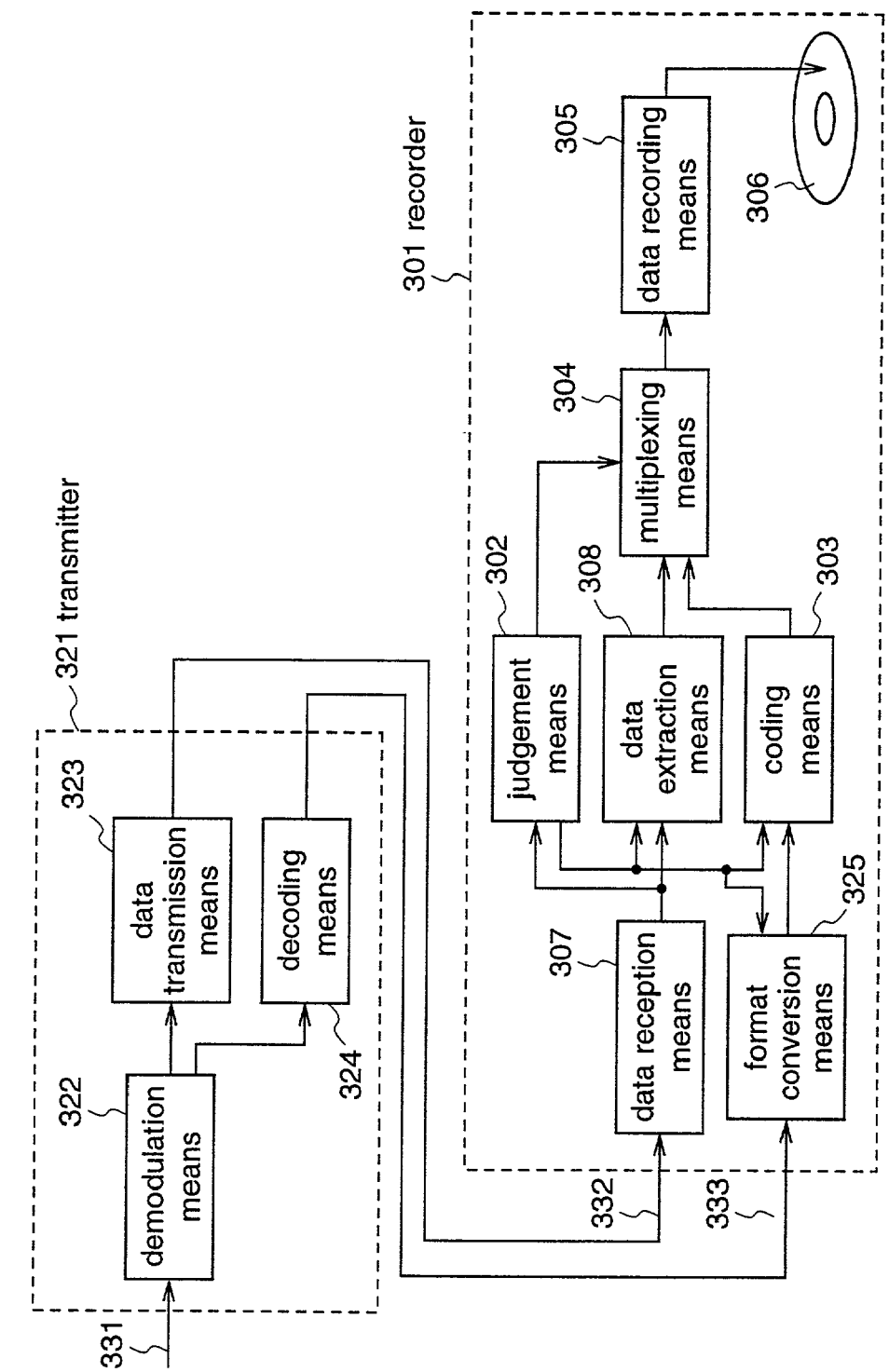
FIG. 4 is a block diagram for explaining a recorder and a transmitter according to a fourth embodiment of the present invention.

Furthermore, while in this third embodiment the transmitter 301 is provided with the format conversion means 325, the recorder 301 may be provided with a format conversion means 325 as shown in FIG. 4. In this case, the format conversion means 325 converts the decoded signal that is received through the analog interface 333 into a format recordable on the recording medium 306, when the judgement means 302 judges that the input digital data is unrecordable or unreproducible after recording.

[Embodiment 4]

Figure 5:
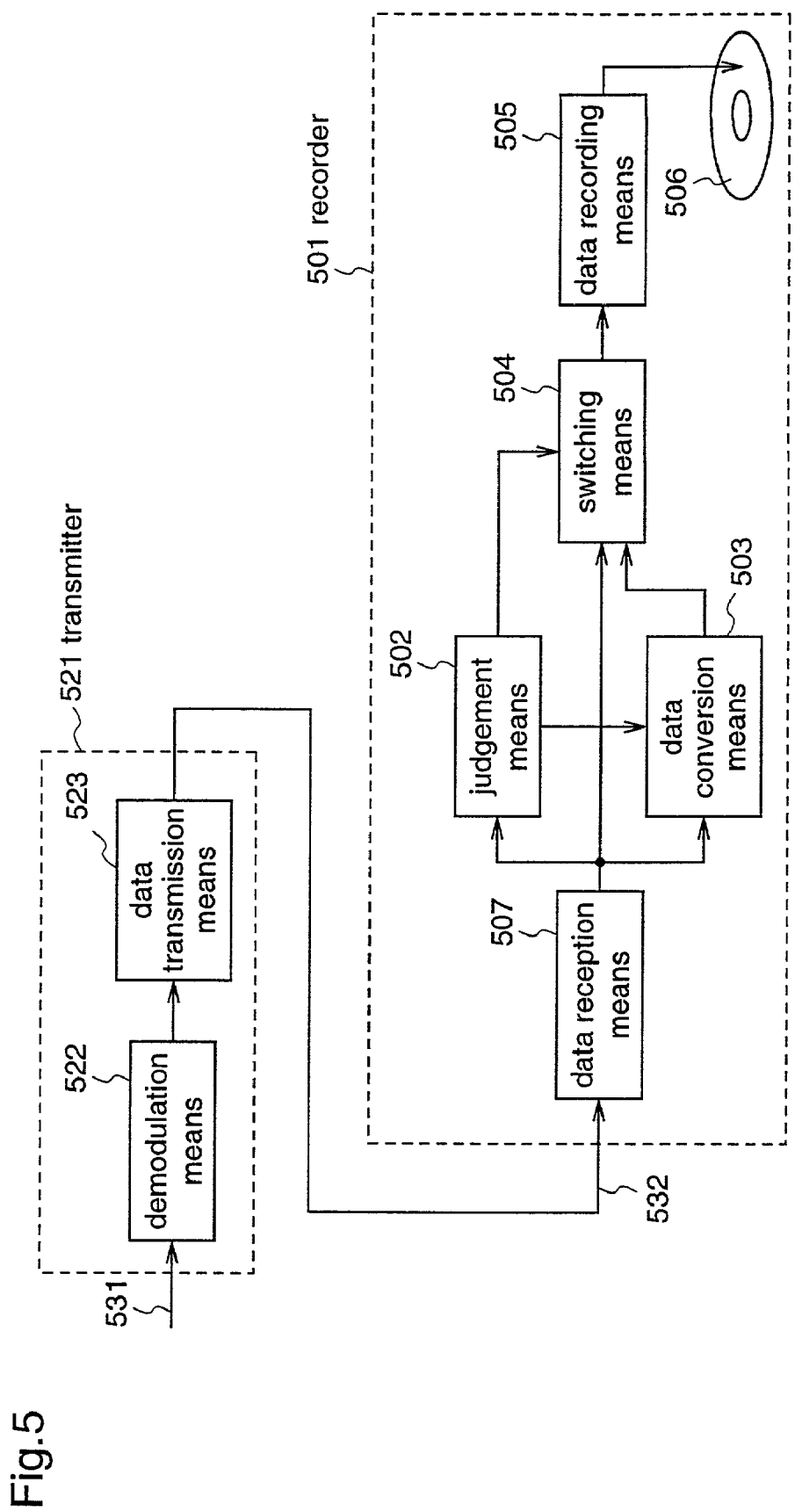
FIG. 5 is a block diagram for explaining a recorder and a transmitter according to the fourth embodiment of the present invention.

Hereinafter, a fourth embodiment of the present invention will be described with reference to FIG. 5. FIG. 5 is a block diagram for explaining the connection between a recorder 501 and a transmitter 521, wherein the recorder 501 comprises a judgement means 502, a data conversion means 503, a switching means 504, a data recording means 505, and a recording medium 506, while the transmitter 521 comprises a demodulation means 522 and a data transmission means 523. Reference numeral 532 denotes a digital interface.

The transmitter 521 receives digital-modulated stream data 531 through an antenna, cable, or the like, and the demodulation means 522 demodulates the inputted stream data 531 to convert it into digital data. The digital data is input to the data transmission means 523. The data transmission means 523 converts the input digital data into a data format corresponding to the digital interface 532, and outputs the converted digital data to the digital interface 532.

The recorder 501 receives the digital data from the transmitter 521 through the digital interface 532. The digital data is received by the data reception means 507, and restored to the digital data of the original data format, and thereafter, supplied to the judgement means 502, the data conversion means 503, and the switching means 504.

The judgement means 502 judges whether the input digital data is data that can be recorded on the recording medium 506, or whether the input digital data is data that can be reproduced after recorded on the recording medium 506.

For example, when the bit rate of the digital data is higher than the maximum recordable rate of the recording medium 506, the judgement means 502 judges that the digital data is unrecordable.

Further, when a decoding means (not shown) included in the recorder 501 cannot decode the digital data, the judgement means 502 judges that the digital data is unreproducible after recording. For example, the decoding means cannot decode the digital data in the case as follows: when the digital data is a high-resolution video signal and the decoding means is adaptable to only decode a low-resolution video signal; or when the audio data included in the digital data is in the MPEG format and the decoding means is adaptable to only decode an audio signal in the AC-3 format.

The result of the judgement by the judgement means 502 is output to the data conversion means 503 and the switching means 504.

The data conversion means 503 does not operate when the judgement means 502 judges that the digital data is recordable or reproducible after recording. When the judgement means 502 judges that the digital data is unrecordable or unreproducible after recording, the data conversion means 503 performs conversion of the data format of the input digital data.

For example, when the judgement means 502 judges that the digital data is unrecordable because of its high bit rate, the data conversion means 503 performs conversion on the digital data to reduce the bit rate. Preferably, the bit rate is reduced by any of the following methods: re-coding of the digital data after decoding; conversion of the data format on the digital data; and deletion of padding data included in the digital data. The digital data so converted is output to the switching means 504.

When the judgement means 502 judges that the digital data is recordable or reproducible after recording, the switching means 504 outputs the digital data supplied from the data reception means 107, as it is. When the judgement means 502 judges that the digital data is unrecordable or unreproducible after recording, the switching means 504 outputs the data supplied from the data conversion means 503.

The data recording means 505 subjects the data outputted from the switching means 504 to signal processing required to record the data on the recording medium 506. The data so processed is recorded on the recording medium 506.

As described above, the recorder according to the fourth embodiment of the invention is provided with the digital interface 532, and when the digital data supplied from the digital interface 532 is unrecordable on the recording medium 506, it is converted to recordable data and then recorded. On the other hand, when the digital data is unreproducible after recording, it is converted to data that is reproducible after recording, and then recorded. Further, when the digital data supplied from the digital interface 532 is recordable or reproducible after recording, the digital data is recorded as it is.

Accordingly, even when the digital data supplied from the digital interface is unrecordable, since the digital data is converted to the recordable data, the data outputted from the transmitter is recorded with reliability. For example, when the bit rate of the digital data is higher than the maximum recordable rate, the digital data is converted so that its bit rate becomes lower than the maximum recording rate. Further, when the digital data supplied from the digital interface is unreproducible after recording, since the digital data is converted to data that is reproducible after recording, the data transmitted from the transmitter is reliably recorded in a format that permits reproduction of the data after recording.

Further, while in this fourth embodiment the judgement means 502 judges that the digital data is unrecordable when the bit rate of the digital data is higher than the maximum recording rate of the recording medium 506, the judgement means 502 may also judge that the digital data is unrecordable when copying of the digital data is inhibited by copy guard.

Further, in the fourth embodiment, the judgement means 502 judges that the digital data is unreproducible after recording when the digital data is a high-resolution video signal and the decoding means included in the recorder 501 is adaptable to only decode a low-resolution video signal, or when the audio data in the digital data is in the MPEG format and the decoding means is adaptable to only decode an audio signal in the AC-3 format. However, the judgement means 502 may also judge that the digital data is unreproducible after recording when the digital data is data video-coded by the PAL method and the decoding means is adaptable to only decode digital data that is video-coded by the NTSC method, or when the digital data is data coded by the MPEG4 coding method and the decoding means is adaptable to only decode digital data coded by the MPEG2 coding method.

Furthermore, in this fourth embodiment, when the judgement means 502 judges that the digital data is unrecordable because of its high bit rate, the data conversion means 503 reduces the bit rate by any of the following methods: re-coding of the digital data after decoding; conversion of the data format on the digital data; and deletion of padding data included in the digital data. However, the method for reducing the bit rate is not restricted to those mentioned above.

[Embodiment 5]

Figure 6:
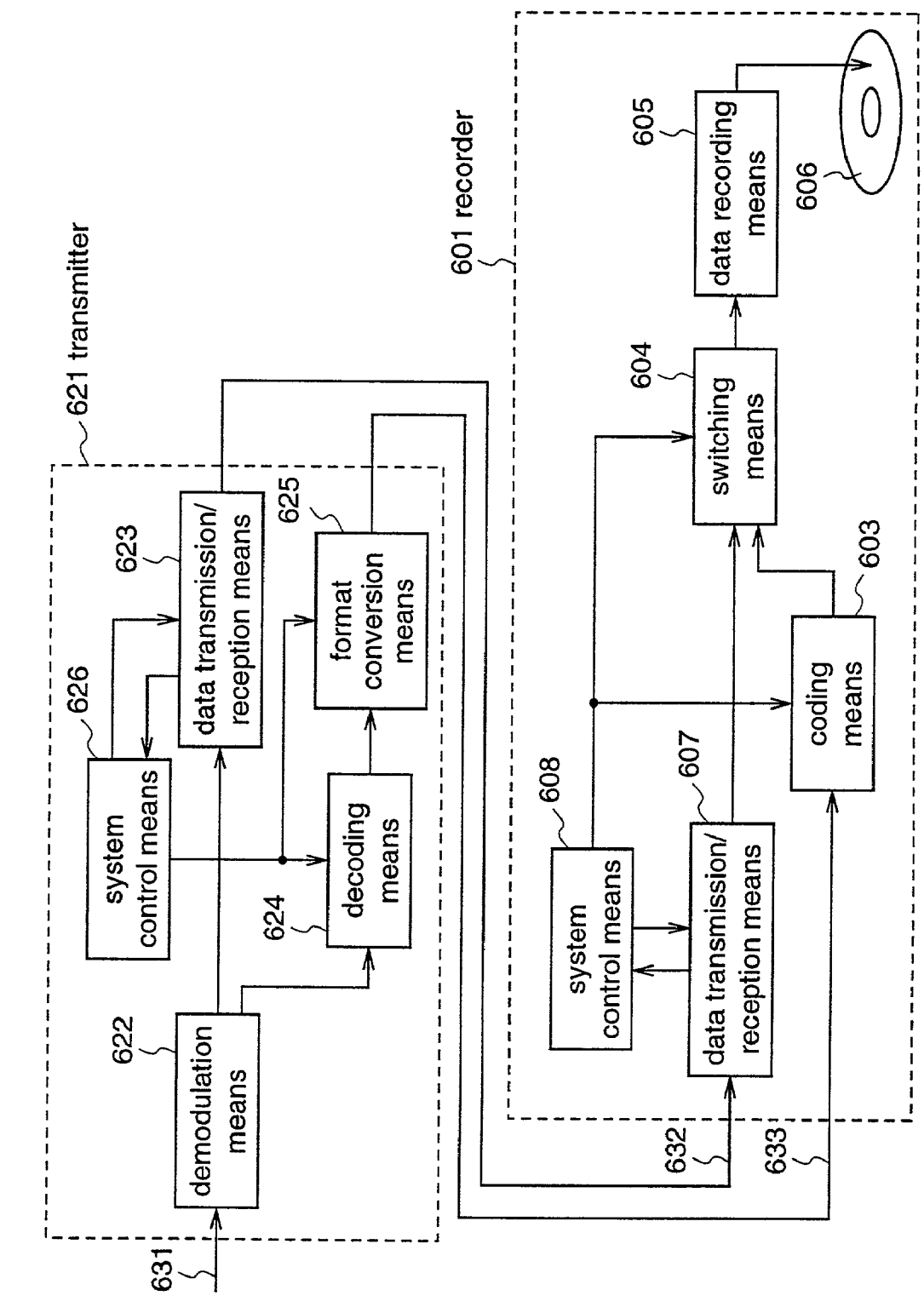
FIG. 6 is a block diagram for explaining a recorder and a transmitter according to a fifth embodiment of the present invention.

Hereinafter, a fifth embodiment of the present invention will be described with reference to FIG. 6. FIG. 6 is a block diagram for explaining the connection between a recorder 601 and a transmitter 621, wherein the recorder 601 comprises a coding means 603, a switching means 604, a data recording means 605, a recording medium 606, a data transmission/reception means 607, and a system control means 608, while the transmitter 621 comprises a demodulation means 622, a data transmission means 623, a decoding means 624, a format conversion means 625, and a system control means 626. Reference numerals 632 and 633 denote a digital interface and an analog interface, respectively.

The transmitter 621 receives digital-modulated stream data 631 through an antenna, cable, or the like, and the demodulation means 622 demodulates the input stream data 631 to convert it into digital data. The digital data is input to the data transmission/reception means 623 and to the decoding means 624.

The system control means 626 makes an inquiry to the recorder 601 as to whether the digital data obtained in the demodulation means 622 is recordable by the recorder 601, or whether the data is reproducible after recorded by the recorder 601. Further, the system control means 626 inquires about the format, bit rate, and the like of the data that is recordable by the recorder 601 or reproducible after recording. For example, the inquiry is made about the maximum bit rate of data that is recordable by the recorder 601 or reproducible after recording, the signal format that is recordable or reproducible after recording, and the like.

The above-mentioned inquiry is carried out through the data transmission/reception means 623. The contents of the inquiry are received by the data transmission/reception means 607 of the recorder 601, and sent to the system control means 608. The system control means 608 sends a response to the inquiry from the system control means 626, through the transmission/reception means 607 and 623, to the system control means 626.

For example, when the inquiry from the transmitter 621 is about the maximum bit rate of data that is recordable by the recorder 601 or reproducible after recording, the system control means 608 sends the maximum recording bit rate at the recorder 601 or the maximum reproduction bit rate, through the data transmission/reception means 607 and 623, to the system control means 626.

When the inquiry from the transmitter 621 is about whether digital data of a certain bit rate is recordable by the recorder 601, or whether the digital data is reproducible after recording, the system control means 608 sends a response to the inquiry through the data transmission/reception means 607 and 623 to the system control means 626. When the system control means 608 judges that the digital data is unrecordable or unreproducible after recording, the system control means 608 sends a bit rate of data that is recordable or reproducible after recording, to the system control means 626.

When the inquiry from the transmitter 621 is about whether digital data of a certain signal format is recordable by the recorder 601, or whether the digital data is reproducible after recording, the system control means 608 sends a response to the inquiry through the data transmission/reception means 607 and 623 to the system control means 626. When the system control means 608 judges that the digital data is unrecordable or unreproducible after recording, the system control means 608 sends a signal format that is recordable or reproducible after recording, to the system control means 626.

When the system control means 626 judges, on the basis of the response from the recorder 601, that the digital data demodulated by the demodulation means 622 is recordable by the recorder 601 or reproducible after recording, the system control means 626 controls the data transmission means 623 to output the digital data. The data transmission means 623 converts the input digital data into a data format corresponding to the digital interface 632, and outputs the converted data to the digital interface 632.

On the other hand, when the system control means 626 judges, on the basis of the response from the recorder 601, that the digital data demodulated by the demodulation means 622 is unrecordable by the recorder 601 or unreproducible after recording, the system control means 626 controls the decoding means 624 to decode the digital data. Further, the system control means 626 controls the format conversion means 625 to convert the signal decoded by the decoding means 624 into a signal format that is recordable by the recorder 601 or reproducible after recording.

The digital data inputted to the decoding means 624 is subjected to decoding, resulting in a decoded signal, i.e., an analog signal. For example, when the digital data includes video data and audio data, the decoding means 624 outputs a video signal and an audio signal. The decoded signal is input to the format conversion means 625. The format conversion means 625 converts the format of the input decoded signal into a format specified by the system control means 626. For example, when the decoded signal is a high-resolution video signal, the format conversion means 625 converts the video signal into a low-resolution video signal. The decoded signal, which has been subjected to format conversion by the format conversion means 625, is output to the analog interface 633.

When the recorder 601 judges that the digital data is recordable or reproducible after recording in response to the inquiry from the transmitter 621, the recorder 601 receives the digital data through the digital interface 633. When the recorder 601 judges that the digital data is unrecordable or unreproducible after recording, the recorder 601 receives the format-converted decoded signal through the analog interface 633. The digital data is input to the switching means 604, while the decoded signal is input to the coding means 603.

The coding means 603 does not operate when the system control means 608 judges that the digital data is recordable or reproducible after recording. When the system controller 608 judges that the digital data is unrecordable or unreproducible after recording, the coding means 603 codes the input decoded signal, and outputs it as coded data.

When the system control means 608 judges that the digital data is recordable or reproducible after recording, the switching means 604 outputs the digital data supplied from the data reception means 607, as it is. When the system control means 608 judges that the digital data is unrecordable or unreproducible after recording, the switching means 604 outputs the coded data supplied from the coding means 603.

The data recording means 605 subjects the data outputted from the switching means 604 to signal processing required to record the data on the recording medium 606. The data so processed is recorded on the recording medium 606.

As described above, the transmitter 621 according to the fifth embodiment of the invention is provided with the digital interface 632 and the analog interface 633, and when it is judged that the digital data to be output is recordable by the recorder 601, to which the digital data is directed, or reproducible after recording, the transmitter 621 outputs the digital data supplied from the digital interface 632. On the other hand, when it is judged that the digital data to be output is unrecordable by the recorder 601 or unreproducible after recording, the transmitter 621 converts the analog signal obtained by decoding the digital data into a format that is recordable by the recorder 601 or reproducible after recording, and outputs the converted signal through the analog interface 633.

Accordingly, even when the digital data is unrecordable by the recorder or unreproducible after recording, since the digital data is converted into an analog signal that is recordable or reproducible after recording, the recorder can reliably record the data (digital data or analog data) outputted from the transmitter 621.

While in this fifth embodiment the transmitter 621 outputs only either of the digital data and the analog data according to the judgement of the system control means 626, the transmitter 621 may output both of these data as in the first embodiment. In this case, the recorder 601 may be provided with a judgement means for judging whether the digital data is recordable, or whether the digital data is reproducible after recording, to judge that either the digital data or the analog signal is to be recorded.

Figure 7:
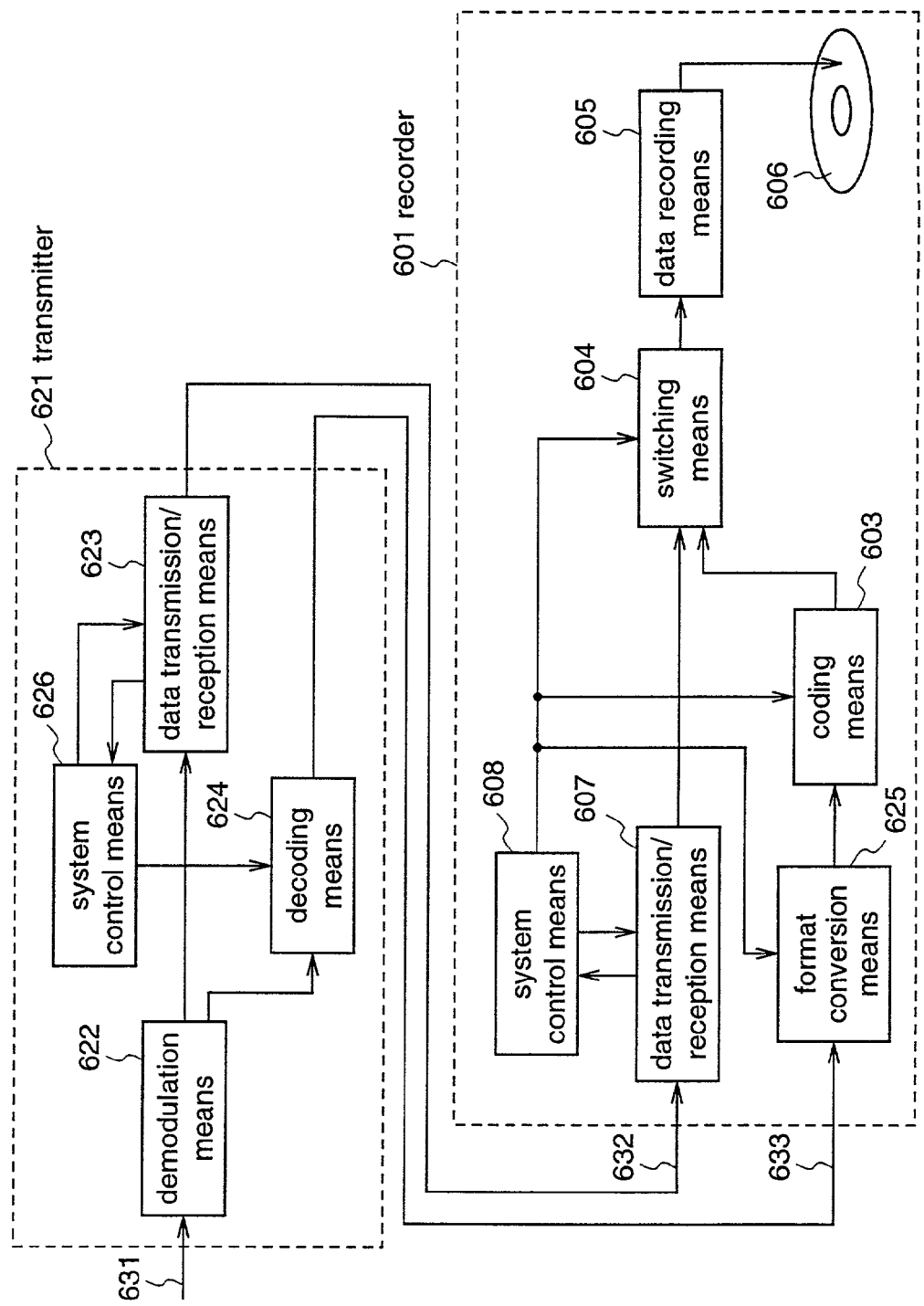
FIG. 7 is a block diagram for explaining a recorder and a transmitter according to the fifth embodiment of the present invention.

Further, while in this fifth embodiment the format conversion means 625 is included in the transmitter 621, the format conversion means 625 may be included in the recorder 601, as shown in FIG. 7. In this case, when the system control means 608 judges that the digital data is unrecordable or unreproducible after recording in response to the inquiry from the transmitter 621, the format conversion means 625 receives the signal decoded by the decoding means 624 through the analog interface 633. Then, the format conversion means 625 converts the decoded signal into a format that is recordable on the recording medium 606.

Furthermore, in this fifth embodiment, the system control means 626 makes an inquiry to the recorder 601 about the maximum bit rate of data that is recordable or reproducible after recording, or the signal format that is recordable or reproducible after recording. However, the contents of the inquiry are not restricted thereto.

[Embodiment 6]

Figure 8:
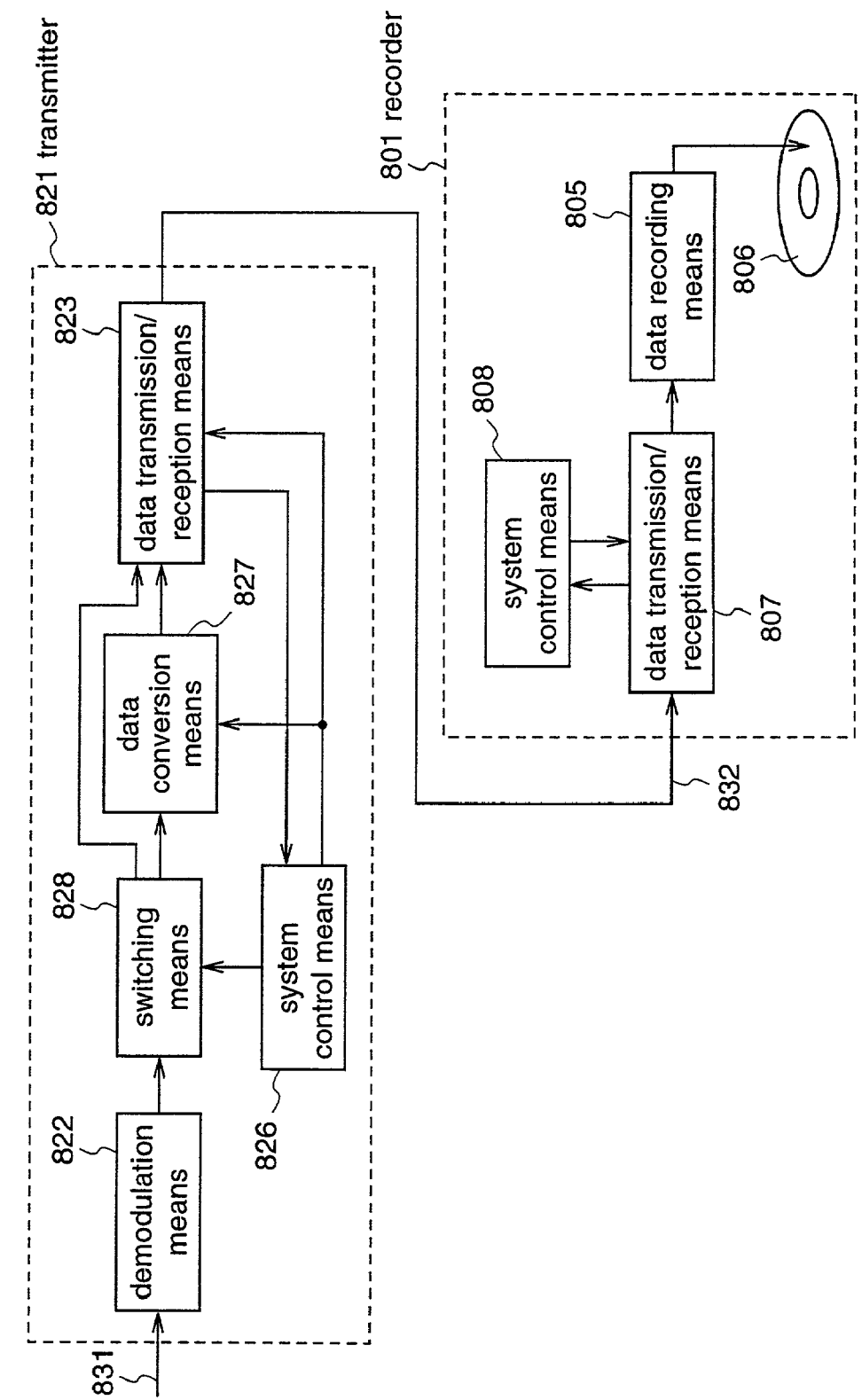
FIG. 8 is a block diagram for explaining a recorder and a transmitter according to a sixth embodiment of the present invention.

Hereinafter, a sixth embodiment of the present invention will be described with reference to FIG. 8. FIG. 8 is a block diagram for explaining the connection between a recorder 801 and a transmitter 821, wherein the recorder 801 comprises a data recording means 805, a recording medium 806, a data transmission/reception means 807, and a system control means 808, while the transmitter 821 comprises a demodulation means 822, a data transmission means 823, a system control means 826, a data conversion means 827, and a switching means 828. Reference numeral 832 denotes a digital interface.

The transmitter 821 receives digital-modulated stream data 831 through an antenna, cable, or the like, and the demodulation means 822 demodulates the inputted stream data 831 to convert it into digital data. The digital data is input to the switching means 828.

The system control means 826 makes an inquiry to the recorder 801 as to whether the digital data obtained in the demodulation means 822 is recordable or whether the data is reproducible after recording. Further, the system control means 826 inquires about the format, bit rate, and the like of the data that is recordable or reproducible after recording. For example, the inquiry is about the maximum bit rate of data that is recordable or reproducible after recording, the signal format that is recordable or reproducible after recording, and the like.

The above-mentioned inquiry is carried out through the data transmission/reception means 823. The contents of the inquiry are received by the data transmission/reception means 807 of the recorder 801, and sent to the system control means 808. The system control means 808 sends a response to the inquiry from the system control means 826, through the transmission/reception means 807 and 823, to the system control means 826.

For example, when the inquiry from the transmitter 821 is about the maximum bit rate of data that is recordable by the recorder 801 or reproducible after recording, the system control means 808 sends the maximum recording bit rate at the recorder 801 or the maximum reproduction bit rate, through the data transmission/reception means 807 and 823, to the system control means 826.

When the inquiry from the transmitter 821 is about whether digital data of a certain bit rate is recordable by the recorder 601 or whether the digital data is reproducible after recording, the system control means 808 sends a response to the inquiry through the data transmission/reception means 807 and 823 to the system control means 826. When the system control means 808 judges that the digital data is unrecordable or unreproducible after recording, the system control means 808 sends a bit rate of data that is recordable or reproducible after recording, to the system control means 826.

When the inquiry from the transmitter 821 is about whether digital data of a certain signal format is recordable by the recorder 801 or whether the digital data is reproducible after recording, the system control means 808 sends a response to the inquiry through the data transmission/reception means 807 and 823 to the system control means 826. When the system control means 808 judges that the digital data is unrecordable or unreproducible after recording, the system control means 808 sends a signal format that is recordable or reproducible after recording, to the system control means 826.

When the system control means 826 judges, on the basis of the response from the recorder 801, that the digital data demodulated by the demodulation means 822 is recordable by the recorder 801 or reproducible after recording, the system control means 826 controls the switching means 828 to output the digital data to the data transmission/reception means 823.

Further, when the system control means 826 judges, on the basis of the response from the recorder 801, that the digital data demodulated by the demodulation means 822 is unrecordable by the recorder 801 or unreproducible after recording, the system control means 826 controls the switching means 828 to output the digital data to the data conversion means 827.

The data conversion means 827 converts the input digital data into data of a bit rate or a signal format that is recordable by the recorder 801 or reproducible after recording. For example, when the digital data is judged as being unrecordable or unreproducible after recording because of its high bit rate, the data conversion means 827 performs conversion so as to reduce the bit rate of the digital data. Preferably, the bit rate is reduced by any of the following methods: recoding of the digital data after decoding; conversion of the data format on the digital data; and deletion of padding data included in the digital data. For example, when the digital data includes video data and audio data and the video data is judged as being unrecordable or unreproducible after recording while the audio data is judged as being recordable or reproducible after recording, only the video data is subjected to the above-mentioned conversion.

The data transmission means 823 converts the digital data supplied from the switching means 828 or the data conversion means 827 into a data format corresponding to the digital interface 832, and outputs the converted data to the digital interface 832.

The recorder 801 receives the digital data from the transmitter 821 through the digital interface 832. The digital data is input to the data recording means 805, subjected to signal processing required for recording the data on the recording medium 806, and then recorded on the recording medium 806.

As described above, the transmitter 821 according to the sixth embodiment is provided with the digital interface 832, and when it is judged that the digital data to be output is recordable by the recorder 801, to which the digital data is directed, or reproducible after recording, the transmitter 821 outputs the digital data supplied from the digital interface 832, as it is. On the other hand, when it is judged that the digital data to be output is unrecordable by the recorder 801 or unreproducible after recording, the transmitter 821 converts the digital data into a format that is recordable by the recorder 801 or a format that is reproducible after recording, and then outputs the converted data through the digital interface 832.

Accordingly, even when the digital data is unrecordable by the recorder or unreproducible after recording, since the digital data is converted into digital data that is recordable or reproducible after recording, the recorder can reliably record or reproduce the digital data outputted from the transmitter 621.

In this fifth embodiment, the system control means 826 makes an inquiry to the recorder 801 about the maximum bit rate of data that is recordable or reproducible after recording, or the signal format that is recordable or reproducible after recording. However, the contents of the inquiry are not restricted thereto.

[Embodiment 7]

Figure 9:
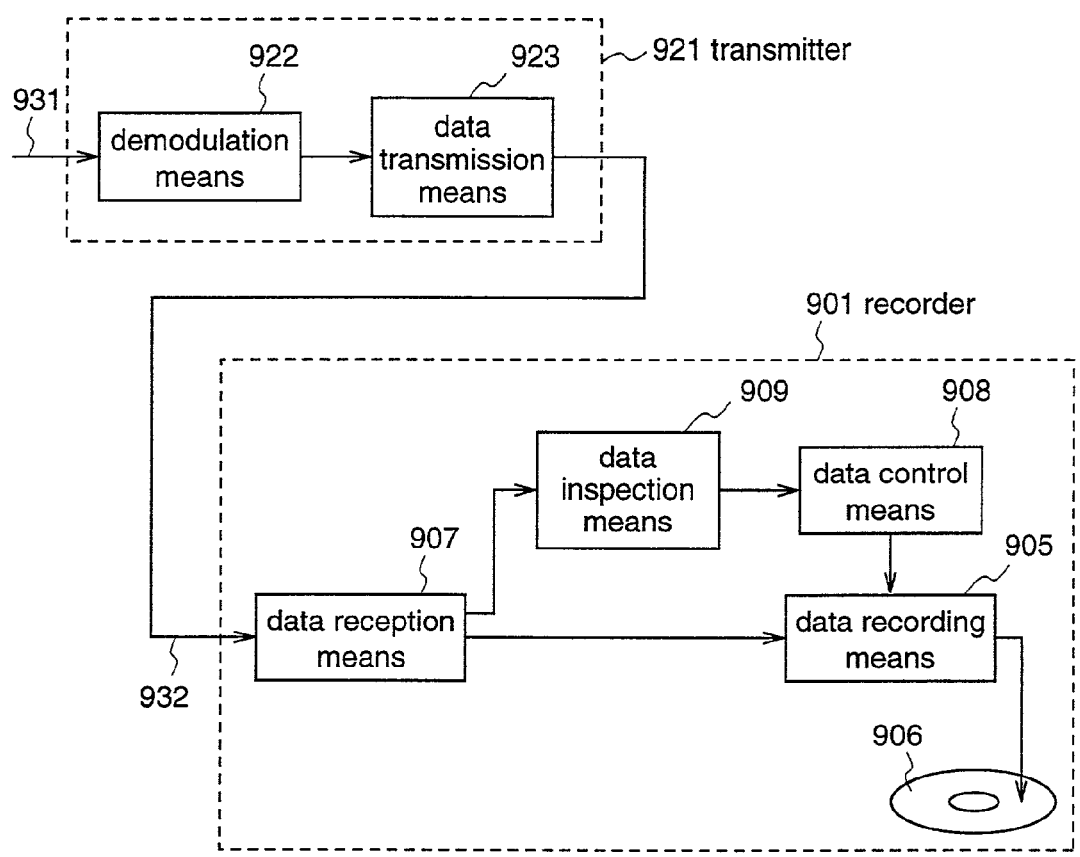
FIG. 9 is a block diagram for explaining a recorder and a transmitter according to a seventh embodiment of the present invention.

Hereinafter, a seventh embodiment of the present invention will be described with reference to FIG. 9. FIG. 9 is a block diagram for explaining the connection between a recorder 901 and a transmitter 921, wherein the recorder 901 comprises a data recording means 905, a recording medium 906, a data reception means 907, a system control means 908, and a data inspection means 909, while the transmitter 921 comprises a demodulation means 922 and a data transmission means 923. Reference numeral 932 denotes a digital interface.

In the transmitter 921, digital-modulated stream data 931 is received through an antenna, cable, or the like, and the demodulation means 922 demodulates the inputted stream data 931 to convert it into digital data. The digital data is input to the data transmission means 923. The data transmission means 923 converts the inputted digital data into a data format corresponding to the digital interface 932, and outputs the converted data to the digital interface 932.

In the recorder 901, the data reception means 907 receives the digital data transmitted from the transmitter 921 through the digital interface 932. The digital data received by the data reception means 907 is restored to the original data format from the data format adapted to the digital interface, and then inputted to the data inspection means 909 and to the data recording means 905.

The data inspection means 909 judges whether the digital data is recordable on the recording medium 906. For example, it judges whether the bit rate of the digital data is higher than the maximum recording bit rate. Then, the data inspection means 909 notifies the system control means 908 of the result of the inspection.

On receipt of the result of the inspection on the digital data by the data inspection means 909, the system control means 908 controls the data recording means 905. When the data inspection means 909 judges that the digital data is recordable, the system control means 908 instructs the data recording means 905 to record the digital data on the recording medium 906. When the data inspection means 909 judges that the digital data is unrecordable, the system control means 908 instructs the data recording means 905 to stop recording of the digital data on the recording medium 906.

When the data recording means 905 is instructed by the system control means 908 to record the inputted digital data, the data recording means 905 subjects the digital data to signal processing required for recording the digital data on the recording medium 906, and then records the digital data on the recording medium 906.

As described above, the recorder according to the seventh embodiment of the invention is provided with the digital interface 932, and judges whether the inputted digital data is recordable on the recording medium 906. When it is judged that the digital data is recordable, the digital data is recorded on the recording medium 906. On the other hand, when it is judged that the digital data is unrecordable, recording of the digital data on the recording medium 906 is stopped.

Accordingly, it is possible to stop recording of the digital data on the recording medium when the bit rate suddenly increases during recording, whereby recording of unreproducible data is avoided. For example, when the recorder receives an MPEG2 transport stream (TS) as digital data from a set-top box as a transmitter and records the TS, if the bit rate of the TS suddenly increases during recording, the recorder can stop recording to prevent unreproducible data from being recorded, whereby fluctuations in video and audio at reproduction are avoided.

[Embodiment 8]

Figure 10:
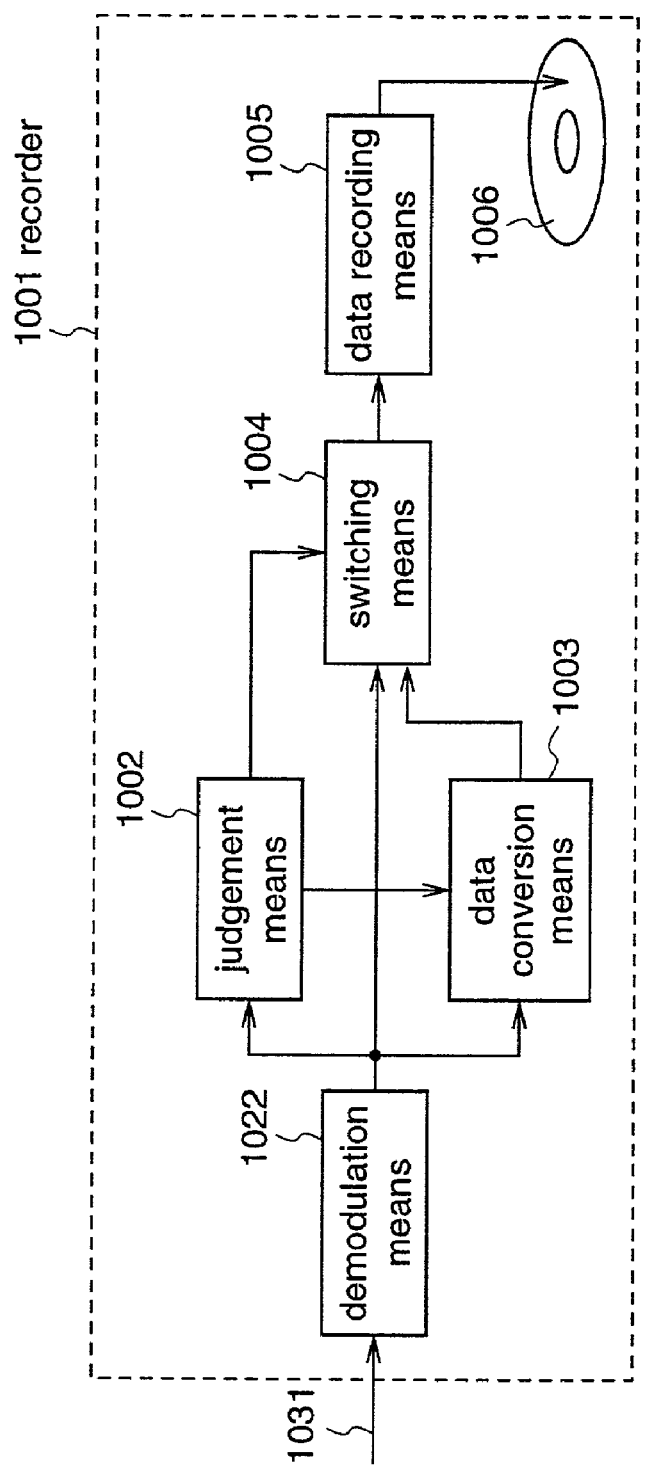
FIG. 10 is a block diagram for explaining a recorder according to an eighth embodiment of the present invention.
Figure 11:
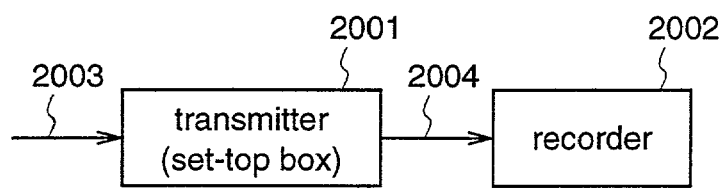
FIG. 11 is a block diagram for explaining a recorder and a transmitter according to the prior art.

Hereinafter, an eighth embodiment of the present invention will be described with reference to FIG. 10. FIG. 10 is a block diagram illustrating a recorder 1001 comprising a judgement means 1002, a data conversion means 1003, a switching means 1004, a data recording means 1005, a recording medium 1006, and a demodulation means 1022.

In the recorder 1001, digital-modulated stream data 1031 is received through an antenna, cable, or the like, and the demodulation means 1022 demodulates the inputted stream data 1031 to convert it into digital data. The digital data is input to the judgement means 1002, the data conversion means 1003, and the switching means 1004.

The judgement means 1002 judges whether the inputted digital data is recordable on the recording medium 1006. For example, when the bit rate of the digital data is higher than the maximum recording rate of the recording medium 1006, the judgement means 1002 judges that the digital data is unrecordable. The result of the judgement by the judgement means 1002 is output to the data conversion means 1003 and the switching means 1004.

The data conversion means 1003 does not operate when the judgement means 1002 judges that the digital data is recordable. When the judgement means 1002 judges that the digital data is unrecordable, the data conversion means 1003 performs data conversion on the inputted digital data. For example, when the judgement means 1002 judges that the digital data is unrecordable because of its high bit rate, the data conversion means 1003 performs conversion so as to reduce the bit rate of the digital data. The bit rate can be reduced by any of the following methods: re-coding of the digital data after decoding; conversion of the data format on the digital data; and deletion of padding data included in the digital data. The digital data so converted is output to the switching means 1004.

When the judgement means 1002 judges that the digital data is recordable, the switching means 1004 outputs the digital data supplied from the demodulation means 1022. When the judgement means 1002 judges that the digital data is unrecordable, the switching means 1004 outputs the data supplied from the data conversion means 1003.

The data recording means 1005 subjects the data outputted from the switching means 1004 to signal processing required to record the data on the recording medium 1006. The data so processed is recorded on the recording medium 1006.

As described above, when the digital data transmitted through the antenna or cable 1031 is unrecordable on the recording medium 1006, the recorder according to the eighth embodiment converts the data into recordable data and then records the data. On the other hand, when the digital data transmitted through the antenna or cable 1031 is recordable data, the recorder records the digital data as it is.

Accordingly, even when the transmitted digital data is unrecordable on the recording medium, the recorder can reliably record the inputted digital data by converting it into recordable data. For example, when the bit rate of the digital data is higher than the maximum recordable rate, the recorder can record the digital data by converting the digital data to make the bit rate lower than the recordable rate.

While in this eighth embodiment the judgement means 1002 judges that the digital data is unrecordable when its bit rate is higher than the recordable rate, the present invention is not restricted thereto.

Further, in this eighth embodiment, when the digital data is judged as being unrecordable because of its high bit rate, the bit rate of the digital data is reduced by any of the following methods: re-coding of the digital data after decoding; conversion on the digital data; and deletion of padding data included in the digital data. However, the method for reducing the bit rate is not restricted thereto.

In the respective embodiments of the present invention, the recording medium may be a magnetic disk, a magnetic tape, an optical disk, a semiconductor memory, or the like.

As described above, a recorder of the present invention is provided with a digital interface and an analog interface, and when digital data supplied from the digital interface is unrecordable on a recording medium or unreproducible after recording, an analog signal supplied from the analog interface is coded to convert it into coded data, and then the coded data is recorded. On the other hand, when the digital data supplied from the digital interface is recordable or reproducible after recording, the digital data is recorded as it is. Therefore, even when the digital data supplied from the digital interface is unrecordable, since the analog signal supplied from the analog interface is coded and recorded, the data outputted from the transmitter is recorded with reliability. Further, even when the digital data supplied from the digital interface is unreproducible after recording on the recording medium, since the analog signal supplied from the analog interface is coded and recorded, the data transmitted from the transmitter is recorded with reliability in a format that permits reproduction of the data after recording.

Furthermore, a recorder of the present invention is provided with a digital interface and an analog interface, and when digital data supplied from the digital interface is unrecordable on a recording medium or unreproducible after recording, an analog signal supplied from the analog interface is subjected to format conversion, and coded to be converted into coded data, and the coded data is recorded. On the other hand, when the digital data supplied from the digital interface is recordable or reproducible after recording, the digital data is recorded as it is. Therefore, even when the digital data supplied from the digital interface is unrecordable, since the analog signal supplied from the analog interface is converted into a recordable format and then coded and recorded, the data outputted from the transmitter is recorded with reliability. Further, even when the digital data supplied from the digital interface is unreproducible after recording on the recording medium, since the analog signal supplied from the analog interface is subjected to format conversion and then coded and recorded, the data transmitted from the transmitter is recorded with reliability in a format that permits reproduction of the data after recording.

Further, a recorder of the present invention is provided with a digital interface and an analog interface, and only data that is recordable on a recording medium or reproducible after recording is extracted from digital data supplied from the digital interface. With respect to data that is unrecordable on the recording medium or unreproducible after recording among the data included in the digital data, an analog signal supplied from the analog interface is coded to be converted into coded data. Then, the data extracted from the digital data and the data obtained by coding the analog signal are multiplexed and recorded on the recording medium. Therefore, even when the digital data supplied from the digital interface is unrecordable, since the analog signal supplied from the analog interface is coded and recorded, the data outputted from the transmitter is recorded with reliability. Further, since the recordable data is extracted from the digital data and recorded, degradation in data quality due to unnecessary re-coding is avoided.

Further, even when the digital data supplied from the digital interface is unreproducible after recorded on the recording medium, since the analog signal supplied from the analog interface is recorded, the data transmitted from the transmitter is recorded with reliability in a format that permits reproduction of the data after recording. Moreover, since the data that is reproducible after recording is extracted from the digital data and then recorded, degradation in data quality due to unnecessary re-coding is avoided.

Further, a recorder of the present invention is provided with a digital interface, and when digital data supplied from the digital interface is unrecordable on a recording medium, it is converted to recordable data and then recorded. On the other hand, when the digital data is unreproducible after recording, it is converted to data that is reproducible after recording, and then recorded. Further, when the digital data supplied from the digital interface is recordable or reproducible after recording, the digital data is recorded as it is. Therefore, even when the digital data supplied from the digital interface is unrecordable, since the digital data is converted into recordable data, the data outputted from the transmitter is recorded with reliability. Further, even when the digital data supplied from the digital interface is unreproducible after recording, since the digital data is converted to data that is reproducible after recording, the data transmitted from the transmitter is recorded with reliability in a format that permits reproduction of the data after recording.

Further, a transmitter of the prevent invention is provided with a digital interface and an analog interface, and when it is judged that digital data to be output is recordable by a recorder to which the digital data is directed or reproducible after recording, the digital data is output from the digital interface. On the other hand, when it is judged that the digital data to be output is unrecordable by the recorder or unreproducible after recording, the transmitter converts an analog signal obtained by decoding the digital data into a format that is recordable by the recorder or reproducible after recording, and outputs the converted signal through the analog interface. Therefore, even when the digital data is unrecordable by the recorder or unreproducible after recording, since the digital data is converted into an analog signal that is recordable by the recorder or reproducible after recording, the recorder can reliably record the data (digital data or analog data) outputted from the transmitter.

Further, a transmitter of the present invention is provided with a digital interface, and when it is judged that digital data to be output is recordable by a recorder to which the digital data is directed or reproducible after recording, the digital data is output as it is from the digital interface. On the other hand, when it is judged that the digital data to be output is unrecordable by the recorder or unreproducible after recording, the transmitter converts the digital data into a format that is recordable by the recorder or reproducible after recording, and outputs the converted data through the analog interface. Therefore, even when the digital data is unrecordable by the recorder or unreproducible after recording, since the digital data is converted into digital data that is recordable by the recorder or reproducible after recording, the recorder can reliably record or reproduce the digital data outputted from the transmitter.

Further, a recorder of the present invention is provided with a digital interface, and judges whether inputted digital data is recordable on a recording medium. When the recorder judges that the digital data is recordable, the recorder records the digital data on the recording medium. On the other hand, when the recorder judges that the digital data is unrecordable, the recorder stops recording of the digital data on the recording medium. Therefore, when the bit rate increases suddenly during recording of the digital data, recording of the digital data on the recording medium can be stopped, thereby avoiding recording of unreproducible data.

Further, according to a recorder of the present invention, when digital data inputted to the recorder through an antenna, cable, or the like is unrecordable on a recording medium, the recorder converts the digital data into recordable data and records the data. On the other hand, when the digital data transmitted through the antenna, cable, or the like is recordable data, the recorder records the digital data as it is. Therefore, even when the transmitted digital data is unrecordable, since the digital data is converted into recordable data, the digital data is recorded with reliability.

What is claimed is:

1. A recorder comprising:
   judgement means for receiving first digital data, and judging whether the first digital data is recordable, or whether the first digital data is reproducible after recording;
   format conversion means for receiving a first analog signal obtained by decoding the first digital data, and format-converting the first analog signal into a second analog signal when the judgement means judges that the first digital data is unrecordable or unreproducible after recording;
   coding means for receiving the first or second analog signal, and coding the first or second analog signal to second or third digital data when the judgement means judges that the first digital data is unrecordable;
   switching means for receiving the second or third digital data as well as the first digital data, and outputting the first digital data when the judgement means judges that the first digital data is recordable or reproducible after recording, while outputting the second or third digital data when the judgement means judges that the first digital data is unrecordable or unreproducible after recording; and
   data recording means for recording the digital data outputted from the switching means on a recording medium.

2. The recorder of claim 1, further comprising:
   said judgement means receiving the first digital data, and judging whether each of plural kinds of data included in the first digital data is recordable or reproducible after recording;
   said format conversion means receiving the first analog signal obtained by decoding the first digital data, and performing format conversion from the first analog signal into the second analog signal, with respect to the data that is judged as being unrecordable or unreproducible after recording by the judgement means;
   said coding means receiving the first or second analog signal, and coding the first or second analog signal to the second or third digital data, with respect to the data that is judged as being unrecordable or unreproducible after recording by the judgement means;
   data extraction means for receiving the first digital data, and extracting, as fourth digital data, the data that is judged as being recordable or reproducible after recording by the judgement means;

multiplexing means for multiplexing the second or third digital data with the fourth digital data to generate fifth digital data; and said recording means recording the fifth digital data on the recording medium.

3. A recorder comprising:

judgement means for receiving first digital data, and judging whether the first digital data is recordable;

data conversion means for converting the first digital data into recordable second digital data when the judgement means judges that the first digital data is unrecordable;

switching means for receiving the first and second digital data, and outputting the first digital data when the judgement means judges that the first digital data is recordable, while outputting the second digital data when the judgement means judges that the first digital data is unrecordable; and data recording means for recording the digital data outputted from the switching means on a recording medium.

4. The recorder of claim 3, wherein said judgement means judges that the first digital data is unrecordable when the bit rate of the first digital data is higher than a predetermined bit rate.

5. A recorder comprising:

judgement means for receiving first digital data, and judging whether the first digital data is reproducible after recording;

data conversion means for converting the first digital data into second digital data that is reproducible after recording, when the judgement means judges that the first digital data is unreproducible after recording;

switching means for receiving the first and second digital data, and outputting the first digital data when the judgement means judges that the first digital data is reproducible, while outputting the second digital data when the judgement means judges that the first digital data is unreproducible; and data recording means for recording the digital data outputted from the switching means on a recording medium.

6. The recorder of claim 5, wherein said judgement means judges that the first digital data is unreproducible after recording, when a coding method used for the first digital data is a method that does not permit decoding by the recorder.

7. A transmitter comprising:

system control means for making an inquiry about whether digital data to be output is recordable by a recorder to which the digital data is transmitted, or whether the digital data is reproducible after recording;

data transmission means for outputting the digital data when it is judged that the digital data is recordable or reproducible after recording by the recorder, on the basis of the result of the inquiry from the system control means;

decoding means for decoding the digital data into a first analog signal, when it is judged that the digital data is unrecordable or unreproducible after recording by the recorder, on the basis of the result of the inquiry from the system control means; and format conversion means for converting the first analog signal into a second analog signal of a data format that is recordable by the recorder or reproducible after recording;

wherein, said decoding means outputs the first analog signal or said format conversion means outputs the second analog signal, when it is judged that the digital data is unrecordable or unreproducible after recording by the recorder, on the basis of the result of the inquiry from the system control means.

8. A transmitter comprising:

system control means for making an inquiry about a recordable data format, to a recorder to which first digital data is to be output;

data conversion means for converting the first digital data into second digital data of a recordable data format, when it is judged that the digital data is unrecordable by the recorder, on the basis of the result of the inquiry from the system control means; and data transmission means for receiving the first and second digital data, and outputting the first digital data when it is judged that the first digital data is recordable by the recorder on the basis of the result of the inquiry from the system control means, while outputting the second digital data when it is judged that the digital data is unrecordable by the recorder on the basis of the result of the inquiry.

9. The transmitter of claim 8, wherein the inquiry from the system control means relates to the bit rate of the digital data, or the format of video data of the digital data.

10. A transmitter comprising:

system control means for making an inquiry about a data format that is reproducible after recording, to a recorder to which first digital data is to be output;

data conversion means for converting the first digital data into second digital data of a data format that is reproducible after recording by the recorder, when it is judged that the digital data is unreproducible after recording, on the basis of the result of the inquiry from the system control means; and data transmission means for receiving the first and second digital data, and outputting the first digital data when it is judged that the first digital data is reproducible after recording by the recorder on the basis of the result of the inquiry from the system control means, while outputting the second digital data when it is judged that the digital data is unreproducible after recording by the recorder on the basis of the result of the inquiry.

11. The transmitter of claim 10, wherein the inquiry from the system control means relates to the bit rate of the digital data, or the format of video data of the digital data.

12. A recorder comprising:

data inspection means for receiving digital data, and for inspecting whether a bit rate of the digital data is higher than a maximum recording bit rate, thereby judging whether the digital data is recordable on a recording medium; and data recording means for recording the digital data on the recording medium when the data inspection means judges that the digital data is recordable, and stopping recording of the digital data on the recording medium when the data inspection means judges that the digital data is unrecordable.

13. A recorder comprising:

demodulation means for demodulating digital-modulated stream data to first digital data;

judgement means for receiving the first digital data, and judging whether the first digital data is recordable;

data conversion means for converting the digital data into second digital data of a recordable data format, when the judgement means judges that the first digital data is unrecordable;

switching means for receiving the first and second digital data, and outputting the first digital data when the judgement means judges that the first digital data is unrecordable, while outputting the second digital data when the judgement means judges that the digital data is unrecordable; and data recording means for recording the digital data outputted from the switching means, on a recording medium.

* * * * *